United States Patent
Ho

(10) Patent No.: US 7,379,462 B2
(45) Date of Patent: May 27, 2008

(54) WLAN ACCESS SCHEDULING CONTROL

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 943 days.

(21) Appl. No.: 10/404,268

(22) Filed: Apr. 1, 2003

(65) Prior Publication Data

US 2004/0196850 A1 Oct. 7, 2004

(51) Int. Cl.
*H04L 12/56* (2006.01)
(52) U.S. Cl. .............. 370/395.4; 370/395.41; 370/395.43; 370/310; 370/338; 370/235; 370/310.1; 370/389; 370/392; 370/390; 370/341
(58) Field of Classification Search .......... 370/395.4, 370/395.43, 395.41, 310, 338, 235, 310.1, 370/389, 392, 390, 241
See application file for complete search history.

(56) References Cited

U.S. PATENT DOCUMENTS

| | | | |
|---|---|---|---|
| 6,011,784 A | | 1/2000 | Brown et al. |
| 6,754,210 B1 | * | 6/2004 | Ofek .................... 370/389 |
| 6,845,100 B1 | * | 1/2005 | Rinne .................. 370/395.43 |
| 6,865,609 B1 | * | 3/2005 | Gubbi et al. ............ 709/230 |
| 7,012,902 B2 | * | 3/2006 | Omi et al. .............. 370/310.1 |
| 7,031,294 B2 | * | 4/2006 | Aiello et al. ............ 370/348 |
| 7,158,532 B2 | * | 1/2007 | Garney et al. .......... 370/447 |
| 2002/0071413 A1 | * | 6/2002 | Choi ..................... 370/337 |
| 2002/0089927 A1 | * | 7/2002 | Fischer et al. ......... 370/229 |
| 2002/0105930 A1 | | 8/2002 | Sydon et al. |
| 2002/0152346 A1 | | 10/2002 | Stone et al. |
| 2003/0026265 A1 | * | 2/2003 | Brouwer et al. ....... 370/395.42 |
| 2003/0147399 A1 | * | 8/2003 | Burns ................... 370/395.4 |
| 2003/0152059 A1 | * | 8/2003 | Odman .................. 370/338 |
| 2005/0190731 A1 | * | 9/2005 | Bejerano et al. ........ 370/338 |

OTHER PUBLICATIONS

Dr. William Shvodian; IEEEP802. 15 Working Gropu for Wireless Personal Area Networks (WPANs); Jan. 2001; Publisher. IEEE; doc:IEEE802. 15-01/119r1.*

(Continued)

*Primary Examiner*—Edan Orgad
*Assistant Examiner*—Wutchung Chu
(74) *Attorney, Agent, or Firm*—Steven A. Shaw; W. James Brady; Frederick J. Telecky, Jr.

(57) ABSTRACT

A system for scheduling access times for transmitting data traffic in a WLAN including both isochronous streams and asynchronous bursts characterized by widely varying parameter values generates a succession of service periods, each having adjustable length and including two or other number of primary access intervals. The service periods may also be adapted to include one or more asynchronous burst periods, each immediately following a primary access interval. Access times for each isochronous stream are scheduled only during a primary access interval, or an immediately following extension period. Asynchronous bursts are scheduled for access times only during asynchronous burst periods. Epoch lengths fluctuate dependent on the dynamic needs and priorities of user traffic. Thus, an access time scheduling is made available that can readily adapt WLAN access to continually changing data traffic conditions, and thereby provide QoS by scheduling access times accordingly.

24 Claims, 6 Drawing Sheets

OTHER PUBLICATIONS

Dr. William Shvodian; IEEE802. 15 working grop for wireless personal area networks (WPANs); Jan. 2001; publisher, IEEE; doc:IEEE802. 15 15-01/119r1.*

Takazawa, T., et al.; *VBR Video Transmission With Isochronous and Asynchronous Transfer Mode Over Wireless 1394*, Oct. 27-30, 2002, vol. 3, pp. 1088-1092.

Natarajan, K.S., et al.; *A Hybrid Medium Access Control Protocol for Wireless LANs*, Jun. 25-26, 1992, pp. 134-137.

* cited by examiner

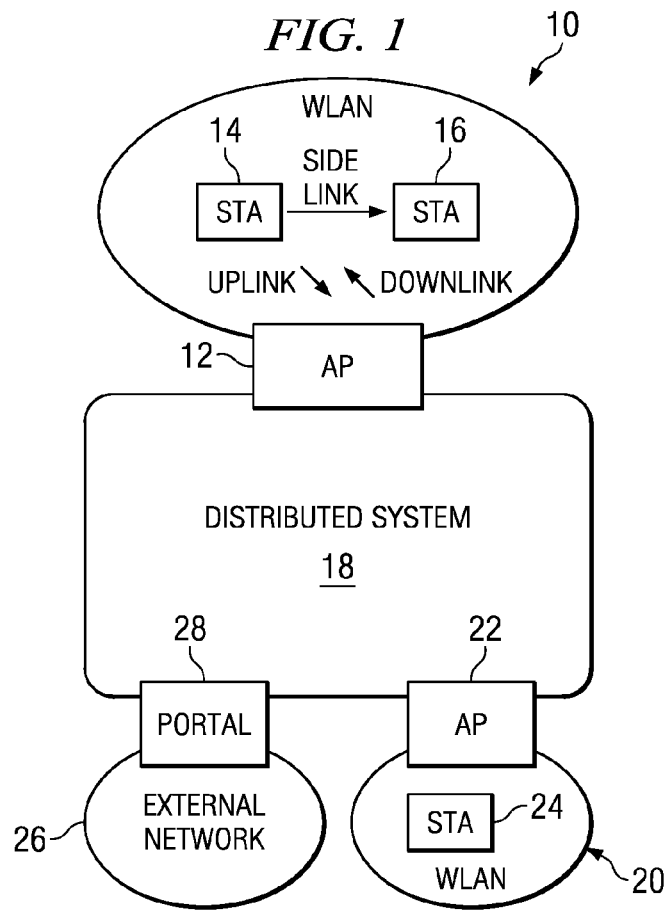
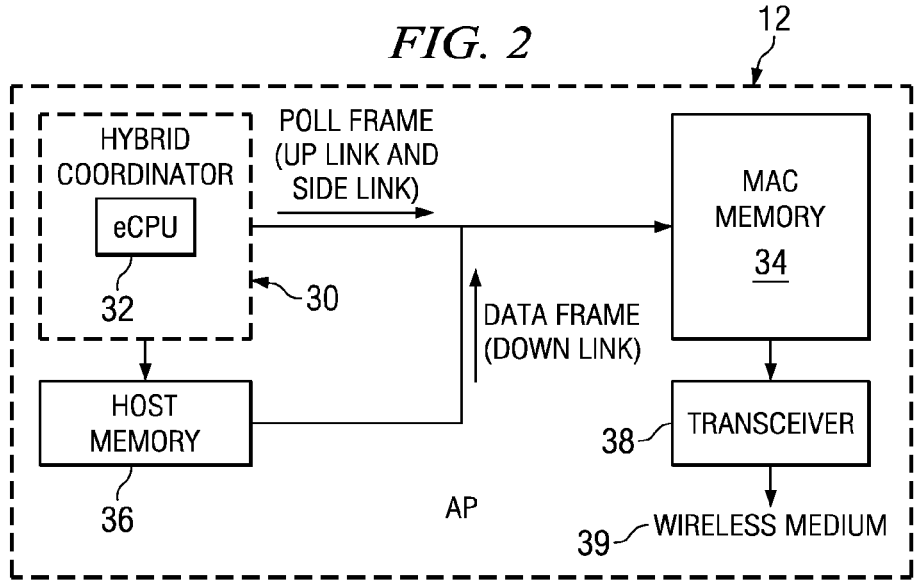

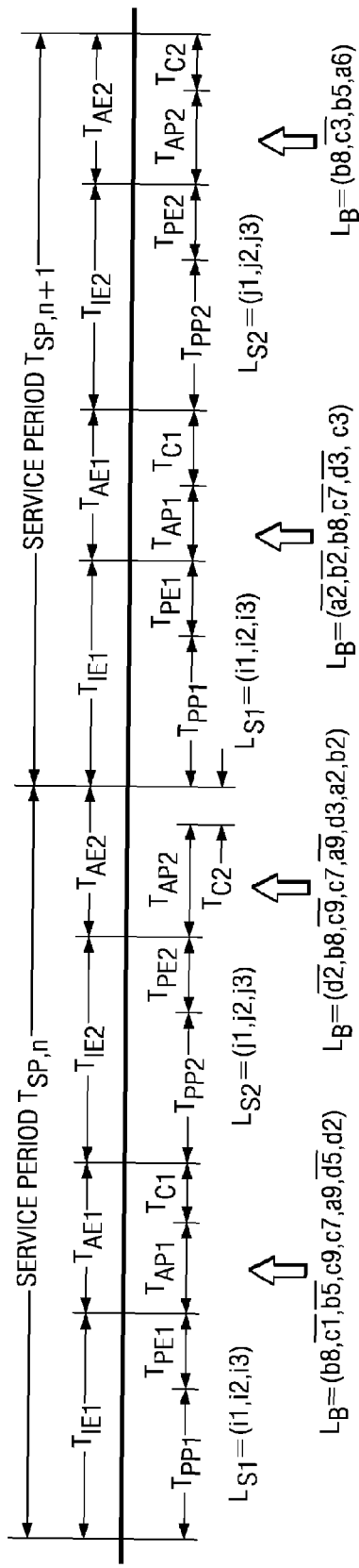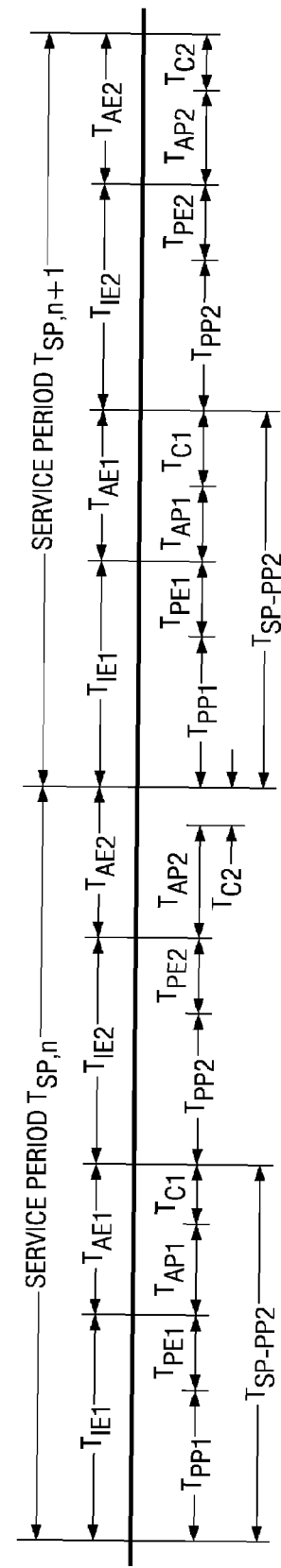

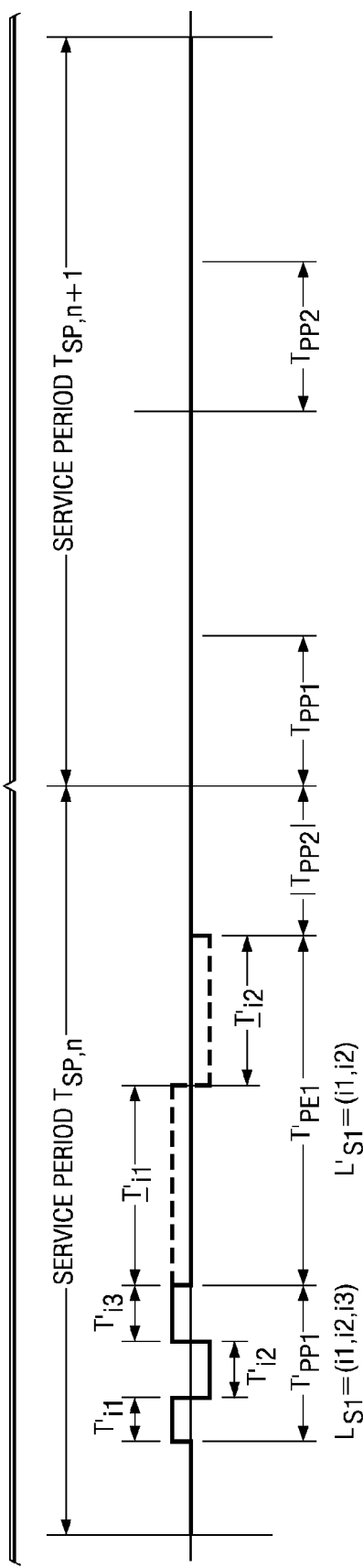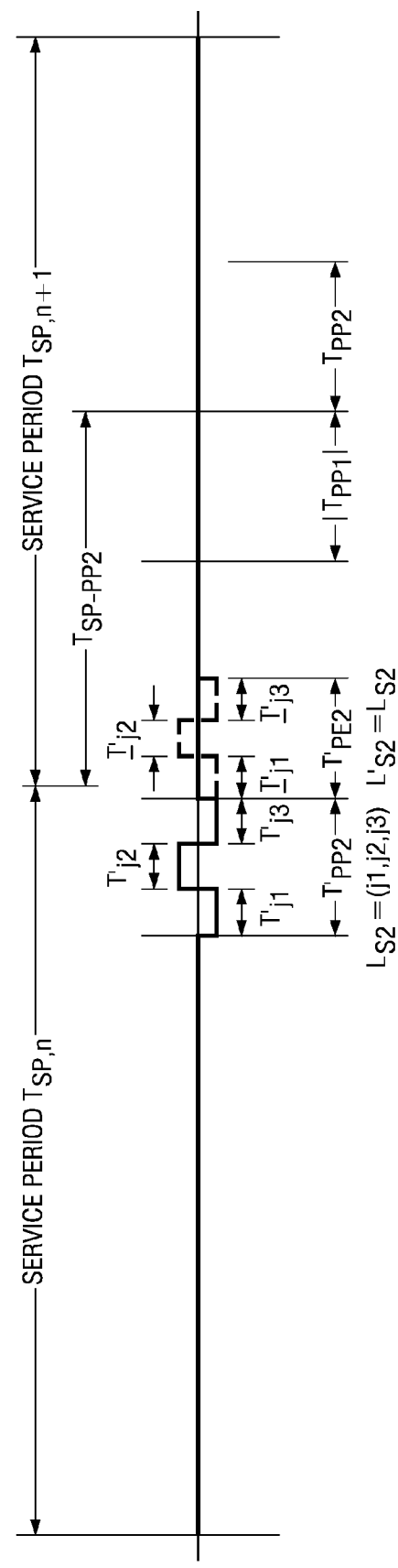
FIG. 6

WLAN ACCESS SCHEDULING CONTROL

TECHNICAL FIELD OF THE INVENTION

The present invention generally pertains to scheduling transmission times for data traffic in a wireless local area network (WLAN) and, more particularly, to scheduling access times for traffic of different types, including isochronous streams and asynchronous bursts.

BACKGROUND OF THE INVENTION

WLAN provides an Ethernet-like channel that uses wireless media (e.g., radios) instead of wires or cables to enable communication between or amongst computers and other types of electronic devices. While providing mobility and portability, WLANs avoid the effort and costs involved in running and maintaining cables, and thus are becoming increasingly popular as a communication medium. A WLAN can have multiple stations and access points (APs), where an AP serves to attach or connect respective stations to an external network and to one another. Generally, a WLAN has several protocol layers—among which are a physical (PHY) layer and a medium access control (MAC) sub-layer. A MAC, comprising hardware and software, is located at each station and AP, and controls access to the medium. A transmission from an AP to a station is referred to as a downlink, a transmission from a station to the AP is referred to as an uplink, and a transmission between stations is referred to as a sidelink.

Because all transmissions within a WLAN must share a single channel or communication medium, conflicts or collisions are likely to occur whenever different traffic streams and bursts simultaneously arrive at one or more transmission points (i.e., stations and the AP collectively) and need to access the shared medium for transport to other transmission points. Accordingly, several approaches have been developed to mediate access between competing traffic streams and bursts, and to provide access scheduling that avoids collisions over the medium.

In an approach commonly known as Distributed Coordinator Function (DCF), the station must sense the medium before a data frame is sent from a station. If the medium is found to be idle for at least a DCF Inter Frame Space (DIFS) period of time, the frame is transmitted. Otherwise, a back-off time B (measured in time slots) is chosen randomly in the interval [0-CW], where CW is the so-called contention window. After the medium has been detected as being idle for at least a DIFS, the back-off timer is decremented for each time slot the medium remains idle. When the back-off timer reaches 0, the frame is transmitted. Upon detection of a collision, a new back-off time is chosen using a CW that is double the previous one, and the back-off procedure starts over.

An enhancement of DCF, commonly known as EDCF, has been developed to provide service differentiation. With EDCF, once a station has gained access to the medium, it can be allowed to send more than one frame without contending for the medium again. More particularly, after obtaining access to the medium, a station is allowed to send as many frames as it wishes, as long as the total access time does not exceed a specified limit.

Furthermore, a WLAN environment may be fairly hostile to radio signals, due to noise and interference as well as a number of other disruptive factors. Accordingly, it is common practice to have a recipient acknowledge a transmission, and for a sender to resend a transmission upon failure to receive an acknowledgement signal after a period of time.

Moreover, WLAN transmissions may be of different traffic types including both isochronous streams and asynchronous bursts. Isochronous streams have quasi-periodic data arrivals and include voice and video streams. Asynchronous bursts are essentially traffic arrivals in burst with low duty cycles and include file transfers and interactive data. The streams and bursts can be of Continuous Bit Rate (CBR) or Variable Bit Rate (VBR), can have respectively different data rates, and can be different from one another in regard to data rates, delay and jitter requirements, acknowledgement policies and other parameters. Also, while there may be distinct advantages in using long data frames in transmissions, there may be other advantages in using shorter frames.

Because of the widely varying characteristics of WLAN traffic, conventional techniques for scheduling access to a WLAN, such as EDCF, have certain significant limitations. For example, if a station having a number of long data frames to send gained access to the medium in an EDCF arrangement, it could transmit its long frames until it was finished, while a station with a shorter frame was forced to wait. This would occur despite the desirability of interposing longer and shorter time frames during successive time periods, such as to reduce jitter between the adjacent longer frames. It might also be desirable to give priority to certain signals in scheduling access (e.g., to enable real-time critical data frames to be sent before non real-time critical data frames). Furthermore, EDCF is a contention based access method, resulting in heavy collisions due to simultaneous transmissions from stations as the number of contending stations increases. Although scheduling methods for contention-free transmissions exist, none of them appear to addresses shared medium access by downlink, uplink, and sidelink, as is the case in a WLAN.

As a result, there is a need for a system for scheduling contention-free access times for data transmissions in a WLAN according to selected Quality of Service (QoS) requirements, such as data rates and delay bounds.

SUMMARY OF THE INVENTION

The present invention provides a versatile system for scheduling access times in a WLAN, wherein the availability of access can be adapted to meet dynamic needs and priorities of user traffic. The present invention thus provides selected QoS levels in scheduling access to the wireless medium for respective WLAN traffic data. As used hereinafter, "scheduling access" and "scheduling access times" mean allocating specific times to stations and APs of a WLAN for respective data transmissions.

Embodiments of this invention can be used with data transmissions of different traffic types, including isochronous streams and asynchronous bursts, and with streams and bursts having data frames of widely varying lengths, data rates and other parameter values. Moreover, embodiments of this invention provide criteria for resolving access conflicts between streams and bursts and between different streams. Embodiments of the present invention provide determination of access times for uplink and sidelink transfers, as well as downlink transfers. Embodiments of this invention also reclaim scheduled access times that cannot be used as originally intended.

One embodiment of the present invention provides a method for scheduling access for transmission of data frames from a first transmission point in a WLAN to a second transmission point therein, wherein data frame traffic includes both isochronous streams and asynchronous bursts, and is characterized by variations in specified parameter values. The method includes defining a succession of service periods, each service period including a specified number of isochronous epochs, and adapting at least one of the service periods to include at least one asynchronous epoch, each asynchronous epoch immediately following an isochronous epoch of the same service period. The method further includes scheduling access for the isochronous streams during the asynchronous epochs, and scheduling access for the asynchronous bursts only during the asynchronous epochs.

In another embodiment, each of the service periods includes two of the isochronous epochs, and further includes one, two or none of the asynchronous epochs, selectively. Each of the isochronous epochs may include a primary access interval, and may be readily adapted to include an extension period. One or more of the isochronous streams are scheduled for access during each of the primary access intervals, and one or more of the scheduled isochronous streams is provided with additional access time during each of the extension periods.

Another embodiment of the present invention provides apparatus for transmitting data frames from a first transmission point in a WLAN to a second transmission point therein, wherein data frame traffic includes both isochronous streams and asynchronous bursts. The apparatus comprises a first component located at one of the transmission points for scheduling access times for data transmission during a succession of service periods. Each service period includes a specified number of isochronous epochs, and at least some of the service periods include one or more asynchronous epochs. The first component may comprise, for example, a hybrid coordinator for the MAC located at an AP of the WLAN. The apparatus may further include a second component—a transceiver located at each station and AP, acting in cooperation with the first component to successively transmit and receive the isochronous streams and asynchronous bursts.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which:

FIG. 1 is a schematic diagram showing basic components of a WLAN disposed for operation in accordance with one embodiment of the present invention;

FIG. 2 is a block diagram showing the access point (AP) of FIG. 1 in further detail;

FIGS. 3-4 are timing diagrams generally illustrating access time scheduling in an embodiment of the present invention;

FIGS. 5-6 are timing diagrams illustrating an embodiment of the present invention wherein extended access time is provided for isochronous streams.

DETAILED DESCRIPTION OF THE INVENTION

Figure 4:
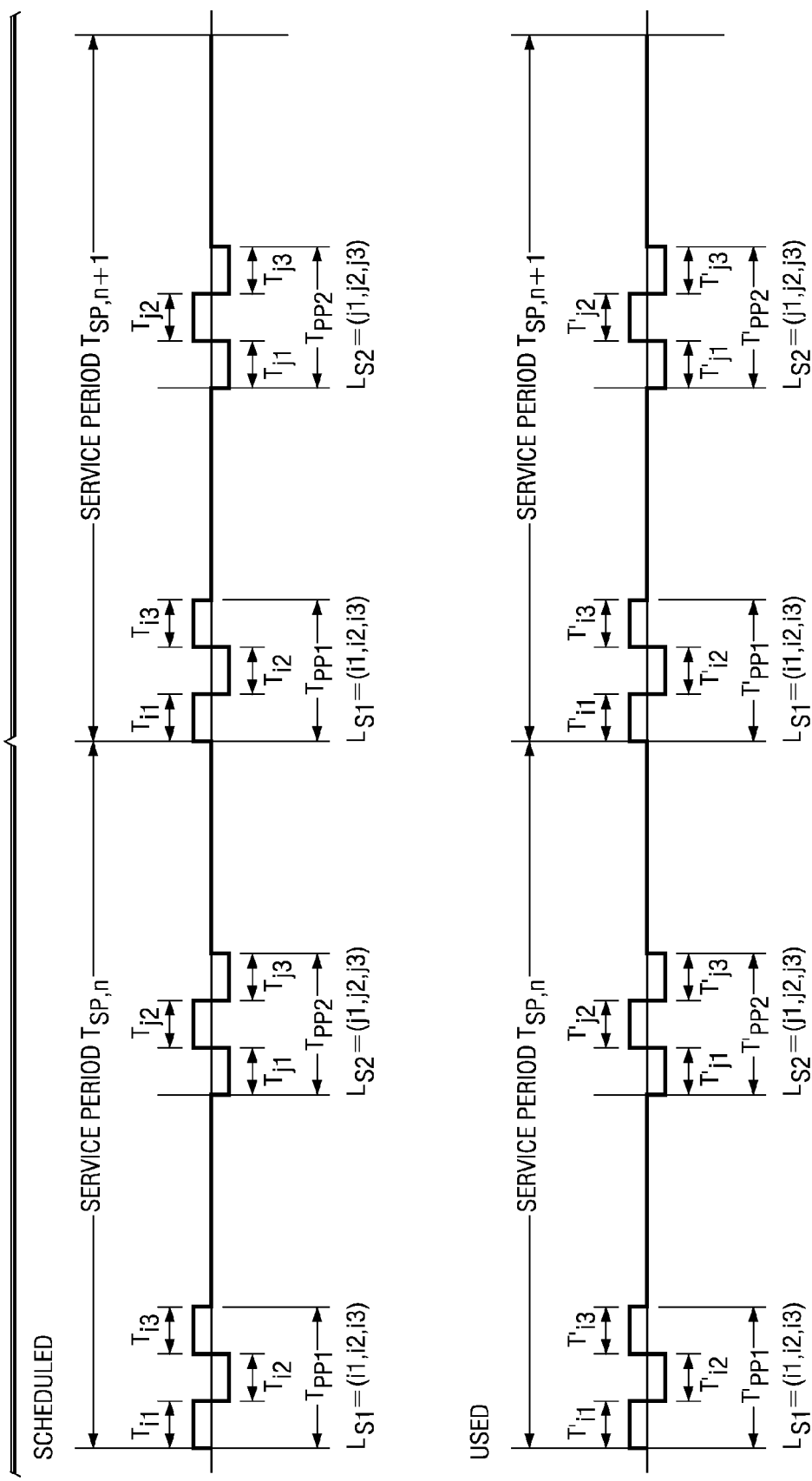

While the making and using of various embodiments of the present invention are discussed in detail below, it should be appreciated that the present invention provides many applicable inventive concepts, which can be embodied in a wide variety of specific contexts. The invention will now be described in conjunction with any memory. The specific embodiments discussed herein are merely illustrative of specific ways to make and use the invention and do not limit the scope of the invention.

The present invention provides a versatile system for scheduling access times in a WLAN. According to the present invention, availability of access can be adapted to meet dynamic needs and priorities of user traffic. The present invention thus provides selected QoS levels in scheduling access to the wireless medium for WLAN traffic data.

Referring to now FIG. 1, a WLAN 10 adapted to operate in accordance with one embodiment of the present invention is depicted. WLAN 10 includes an AP 12 and stations 14 and 16, by way of illustration. Operational WLANs likely would include many more stations. FIG. 1 also shows AP 12 connected to a distributed system 18. Accordingly, a communication path can be established from AP 12 to another WLAN 20 through an AP 22, which is also connected to distributed system 18. Respective stations of WLAN 10 are thereby able to communicate with the station 24 of WLAN 20.

A downlink transmission in WLAN 10 is directed from the AP 12 to a station, an uplink transmission is directed from a station to the AP 12, and a sidelink transmission is directed from one station to another. WLAN 10 is provided with a MAC sub-layer. Access for data transmissions in WLAN 10 is scheduled in accordance with one embodiment of the invention, as described hereinafter. Such scheduling accommodates data traffic in the form of both isochronous streams and asynchronous bursts, and readily adapts to continual variations in data amount and other parameters. Thus, selective QoS is provided by scheduling access for data transmission in accordance with embodiments of the invention.

For a downlink transfer, AP 12 transmits a data frame that may be QoS Data, or a data frame combined with a poll frame, such as QoS Data+CF-Poll or QoS Data+CF-Ack+CF-Poll. For an uplink or sidelink transfer, AP 12 transmits a poll frame, such as a QoS CF-Poll, a QoS CF-Ack+CF-Poll, or a QoS Data+CF-Ack+CF-Poll frame. A poll frame grants a specific access time to a polled station for the transmission of data from this station into the wireless medium within that access time. When appropriate, an acknowledgement frame, such as a QoS CF-Ack, is sent back to the sender of the data frame by the addressed recipient of that data frame, within a Short Inter-Frame Space (SIFS) of the end of the data frame to acknowledge receipt of the data frame.

Referring to FIG. 2, there is shown AP 12 provided with a hybrid (or access) coordinator 30. Hybrid coordinator 30 is the component of the MAC for WLAN 10 that is used to schedule access for data transmissions within WLAN 10. Hybrid coordinator 30 has an eCPU 32, and schedules access in accordance with one embodiment of the present invention, as described hereinafter.

FIG. 2 further shows AP 12 provided with MAC hardware memory 34 and a host memory 36. For a downlink transfer, eCPU 32 transfers a data frame of the next isochronous stream or asynchronous burst scheduled for access from host memory 36 to the MAC hardware memory 34, at a time $T_D$ before the expected starting time of that data frame. For uplink and sidelink transfers in WLAN 10, eCPU 32 at the hybrid coordinator 30 prepares a poll frame in the MAC hardware memory 34 at a time $T_P$ before the expected starting time of such poll frame. If there is data to be sent along with the poll frame, the transfer procedure described above in connection with downlink transfer is followed. Frames are transmitted from memory 34 by transceiver 38 into a wireless medium 39.

Referring to FIG. 3, there is shown the time for scheduling access within WLAN 10 divided into a succession of service periods $T_{SP,n}$, $T_{SP,n+1}$. There is further shown a set of time hierarchies in each service period, including two isochronous epochs $T_{IE1}$ and $T_{IE2}$, which are time intervals when isochronous streams may be scheduled for access. Each of the isochronous epochs is further divided, $T_{IE1}$ into $T_{PP1}$ and $T_{PE1}$, and $T_{IE2}$ into $T_{PP2}$ and $T_{PE2}$. $T_{PP1}$ and $T_{PP2}$ are the primary access intervals for isochronous streams, and $T_{PE1}$ and $T_{PE2}$ are the secondary or extension access intervals therefor, as described hereinafter.

Referring further to FIG. 3, each service period is also shown to include asynchronous epochs $T_{AE1}$ and $T_{AE2}$, the access intervals for asynchronous bursts. Time may also be made available during these epochs, if desired, for implementing an (E)DCF-like contention mediation scheme to send short data frames and/or reserve access times by stations having new asynchronous bursts to send. Accordingly, asynchronous epochs $T_{AE1}$ and $T_{AE2}$ are further divided, into $T_{AP1}$ and $T_{C1}$, and $T_{AP2}$ and $T_{C2}$, respectively. $T_{AP1}$ and $T_{AP2}$ are the intervals allocated to provide contention-free access for asynchronous bursts, whereas $T_{C1}$ and $T_{C2}$ are the access intervals for contention mediation.

In one embodiment of the present invention, active isochronous streams of data (i.e., streams waiting for access times for transmission in the WLAN) are respectively organized into two Stream Lists $L_{S1}$ and $L_{S2}$. The streams in $L_{S1}$ and $L_{S2}$ have access times scheduled during intervals $T_{PP1}$ and $T_{PP2}$, respectively, for each service period, and the streams are placed on the respective lists so that $T_{PP1}$ is approximately equal to $T_{PP2}$. Streams are ordered in each list in ascending delay bounds, so that the stream with the smallest delay bound ($T_{DB}$) is first on the list. Moreover, the streams in each list are updated upon change of an isochronous stream, have the scheduled access times repeated in each service period, and may have extended access times during extension intervals $T_{PE1}$ and $T_{PE2}$.

In one algorithm for constructing stream lists $L_{S1}$ and $L_{S2}$, the indexes i of active streams are ordered in ascending value of $T_{DB}$, to provide i1, i2, . . . ip. Access times $T_{i1}$, $T_{i2}$ . . . $T_{ip}$ are then determined for respective active streams, for each successive service period $T_{SP}$. $L_{S1}$ is set to i1, $L_{S2}$ is set to i2, and $T_{PP1}$ and $T_{PP2}$ are made equal to $T_{i1}$ and $T_{i2}$, respectively. Then, the following procedure is continually looped:

For ij=i3 to ip:
if $T_{PP1}$ is less then $T_{PP2}$, then index ij is appended to $L_{S1}$, and $T_{PP1}$ is set to $T_{PP1}+T_{ij}$;
else, index ij is appended to $L_{S2}$ and $T_{PP2}$ is set to $T_{PP2}+T_{ij}$.

Hereinafter, as shown in FIG. 3, contents of Stream Lists $L_{S1}$ and $L_{S2}$ are represented as (i1, i2, i3) and (j1, j2, j3), respectively.

Referring further to FIG. 3, Burst List $L_B$ is depicted, containing all active asynchronous bursts. The bursts in $L_B$ are ordered in ascending arrival times of the bursts and have user priorities A-D. Access times in the next following asynchronous interval $T_{AP1}$ or $T_{AP2}$ are allocated to the bursts in List $L_B$, in a first come first serve (FCFS) order, and the List $L_B$ is updated upon arrival or removal of each asynchronous burst.

In one algorithm for constructing Burst List $L_B$, the indexes of active bursts are ordered in ascending burst arrival times to provide v1, v2 . . . , vw. Burst vj, the burst at the head of List $L_B$, is removed from $L_B$ when its allocated access time begins, regardless of whether the burst will be completely transferred within such access time. Burst vk is appended to $L_B$ upon arrival. Arrival of such a burst is indicated by a nonzero Remaining Data Size or by an Additional Access Time of the Transmit (TX) Descriptor for the burst vk. An existing burst that was removed from $L_B$ when its access time began is appended to $L_B$ following that access time, if there is an indication that the burst has more buffered data at that time. A new burst is appended to $L_B$ when there is found an indication that the new burst has arrived at a station or the AP for transfer. For uplink/sidelink transfer the indication comes from a QoS Data or QoS Null frame sent in response to a poll in a previous primary access interval or extension period or by means of contention in a previous (E)DCF section.

In the timing arrangement shown in FIG. 3, the time $T_{SP}$ for a service period can be determined from the following:

$$T_{SP}=\text{Max}[T_{SP,Min}, \text{Min}(T_{SP,Max}, T_{Beacon}, T_{IAI,i}, T_{DB,i}, T_{JB,i})],$$

i∈all active isochronous streams     Eqn. (1)

In the relationship shown in Eqn. (1), $T_{SP,Min}$ and $T_{SP,Max}$ are pre-set lower and upper limits on $T_{SP}$, and are usefully selected to be 12 ms and 20 ms, respectively, but are not limited thereto. $T_{IAI,i}$ and $T_{JB,i}$ are the inter-arrival interval and the jitter bound for the ith isochronous stream, respectively. $T_{Beacon}$ is the period of a synchronizing beacon frame transmitted by the AP of WLAN 10. Thus, in order to determine the value of a service period $T_{SP}$, the lowest value of a number of parameters with respective to all the admitted isochronous streams as indicated in Eqn (1) is first determined. $T_{SP}$ is then selected to be either such lowest value or $T_{SP,Min}$, whichever is greater.

FIG. 4 depicts streams i1, i2, and i3 scheduled for access times $T_{i1}$, $T_{i2}$ and $T_{i3}$, respectively, during the primary access interval $T_{PP1}$ of each service period. Similarly, streams j1, j2, and j3 are scheduled for access times $T_{j1}$, $T_{j2}$, and $T_{j3}$ during the primary access interval $T_{PP2}$ of each service period. The target start time of $T_{PP1}$ coincides with the start of its corresponding service period $T_{SP}$. The target start time of $T_{PP2}$ is $T_{SP-PP2}$, following the commencement of the corresponding service period.

$T_{PP1}$ and $T_{PP2}$ are more specifically provided by the following relationships:

$$T_{PP1}=\Sigma Ti, i \in L_{S1} \qquad \text{Eqn. (2a)}$$

$$T_{PP2}=\Sigma Tj, j \in L_{S2} \qquad \text{Eqn. (2b)}$$

Referring further to FIG. 4, streams i1, i2, and i3 are depicted, actually using access times $T'_{i1}$, $T'_{i2}$, and $T'_{i3}$, respectively, during intervals $T'_{PP1}$ of the consecutive service periods. $T'_{PP1}$ and $T'_{PP2}$ are more specifically shown as follows, where $T'_{PP1}$ is the access time that is actually used out of the scheduled access period:

$$T'_{PP1}=\Sigma T'_i, i \in L_{S1} \qquad \text{Eqn. (3a)}$$

$$T'_{PP2}=\Sigma T'_j, j \in L_{S2} \qquad \text{Eqn. (3b)}$$

For certain embodiments of the present invention, the following conventions may be applied:

(1) T'$_i$ may always be less then or equal to T$_i$;
(2) T'$_i$ may start earlier then scheduled, and be greater than T$_i$ only if the period of T'$_i$ ends no later than the targeted or scheduled end of T$_i$.

The present invention thus provides access intervals T$_{PE1}$ and T$_{PE2}$, which can be used to extend the access time allocated to isochronous streams in a service period T$_{SP}$. FIG. 5 shows extended interval T$_{PE1}$, scheduled out of the isochronous epoch T$_{IE1}$ of a service period, and further shows interval T$_{PE2}$ scheduled thereafter. If $\underline{T}_i$ is the extended access time allocated in interval T$_{PE1}$ or T$_{PE2}$ for stream i in a service period, then:

$$T_{PE1} = \Sigma \underline{T}_i, \quad i \in L_{S1} \qquad \text{Eqn. (4a)}$$

$$T_{PE2} = \Sigma \underline{T}_j, \quad j \in L_{S2} \qquad \text{Eqn. (4b)}$$

$\underline{T}_i$ is the minimum value of either T$_{i-}$, or the quantity (T$_n$+T$_i$−T'$_j$), where T'$_i$ is the actual access time used based on T$_i$, T$_{i-}$ is the additional access time needed after T'$_i$ to transfer the remaining buffered data of stream i, and T$_n$ is the eligible access time not yet used by stream i at the beginning of T$_{SP,\,n}$. T$_n$ recursively determines T$_{n+1}$, T$_{n+1}$=$\underline{T}_n$+T$_i$−T'$_i$−$\underline{T}'_i$, for use in similar calculations for the next service period.

Referring now to FIG. 6, T'$_{PE1}$ and T'$_{PE2}$ are the amounts of time actually used for extended access times for service period T$_{SP,\,n}$. T'$_{PE1}$, shown in timing diagram (A), is the sum of $\underline{T}'_{i1}$ and $\underline{T}'_{i2}$, the access time extensions actually used for streams i1 and i2, respectively. T'$_{PE2}$, in timing diagram (B), is the sum of $\underline{T}'_{j1}$, $\underline{T}'_{j2}$, and $\underline{T}'_{j3}$, the access time extensions used for streams j1, j2 and j3, respectively. If $\underline{T}'_i$ is the extended access time actually used out of the allocated extended access time $\underline{T}_i$, T'$_{PE1}$ and T'$_{PE2}$ have the following relationships:

$$T'_{PE1} = \Sigma \underline{T}'_i, \quad i \in L'_{S1} \qquad \text{Eqn. (5a)}$$

$$T'_{PE2} = \Sigma \underline{T}'_j, \quad j \in L'_{S2} \qquad \text{Eqn. (5b)}$$

In one embodiment of the invention, the actually used extended access time $\underline{T}'_i$ can be less than or equal to the allocated extended access time $\underline{T}_i$, but can never be greater. Also, the extended access time List L'$_{S1}$ for service period T$_{SP_n}$ must be limited to the elements in the front of L$_{S1}$ such that the actual extension interval T'$_{PE1}$ will end before the targeted or scheduled start of the next T$_{PP1}$ by |T$_{PP2}$| |T$_{PP2}$| is the length of the second scheduled primary access interval for service period T$_{SP,n}$, and the next T$_{PP1}$ is the first scheduled primary access interval for service period T$_{SP,n+1}$.

In like manner, list L'$_{S2}$ for service period T$_{SP,n}$ must be limited to the elements in the front of L$_{S2}$ so that T'$_{PE2}$ will end before the targeted start of T$_{PP2}$ for the next service period T$_{SP,n+1}$ by |T$_{PP1}$|. |T$_{PP1}$| is the length of the first scheduled primary access interval for service period T$_{SP,n+1}$. It is seen from timing diagram (B) of FIG. 6 that access time extensions associated with a service period can be extended into the next following service period, provided the above criteria are met. This feature enhances flexibility and efficiency in the access time scheduling process.

Figure 7:
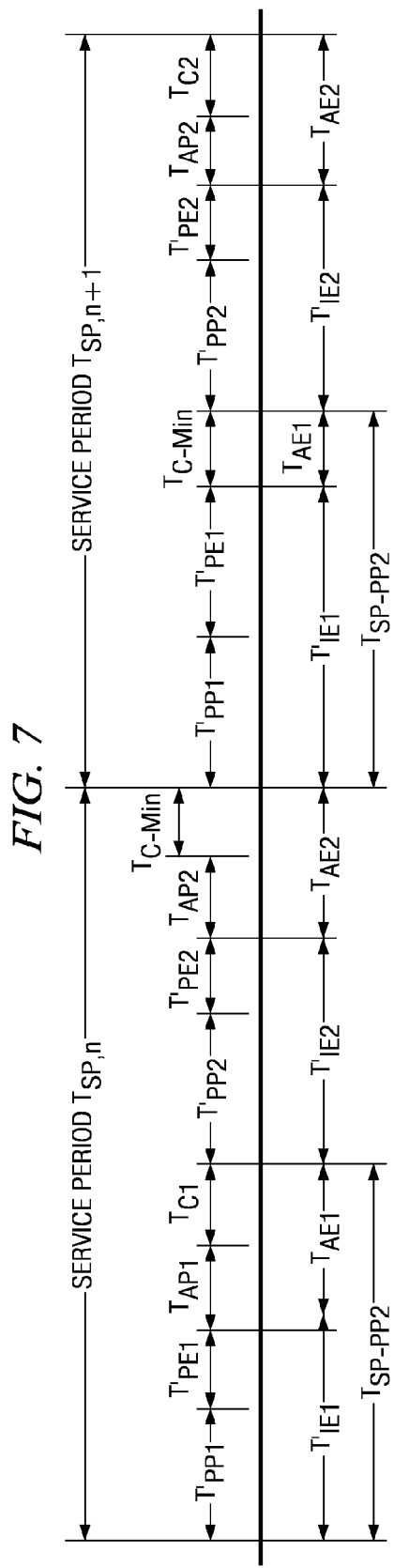
FIGS. 7-8 are timing diagrams illustrating one embodiment of the present invention wherein access time is provided for asynchronous bursts.

Referring now to FIG. 7, each service period comprises a burst access interval T$_{AP1}$ lying within an asynchronous epoch T$_{AE1}$ which follows the actually used isochronous epoch T'$_{IE1}$, and another burst access interval T$_{AP2}$ lying within an asynchronous epoch T$_{AE2}$ occurring after the actually used isochronous epoch T'$_{IE2}$. If T$_v$ is the access time allocated in the next interval T$_{AP1}$ or T$_{AP2}$ for the burst v, then access is given to the bursts in L$_B$ sequentially and takes place in T$_{AP1}$ or T$_{AP2}$, whichever comes next. More specifically, $$T_{APK} = \Sigma T_v, \quad v \in L_B \qquad \text{Eqn. (6)}$$

T$_{APK}$ must end at a time T$_{C\text{-}MIN}$ before the end of the next scheduled primary access interval, whether T$_{PP1}$ or T$_{PP2}$. T$_{C\text{-}MIN}$ is the minimum interval provided for contention access.

It may be desirable to establish user priority for respective bursts v. For example, in one arrangement each burst is allocated an access time T$_V$, where V=A, B, C or D, A<B<C<D. The access times for bursts of respective priorities are then T$_A$=W$_A$×T$_O$, T$_B$=W$_B$×T$_O$, T$_C$=W$_C$×T$_O$, and T$_D$=W$_D$×T$_O$. The W$_v$ are weighting values, such as W$_A$=1, W$_B$=2, W$_C$=3, and W$_D$=4. T$_O$ is a time period that may be derived from the weighting values and from the numbers of bursts of respective priorities at the beginning of each burst interval T$_{AP1}$ or T$_{AP2}$.

Figure 8:
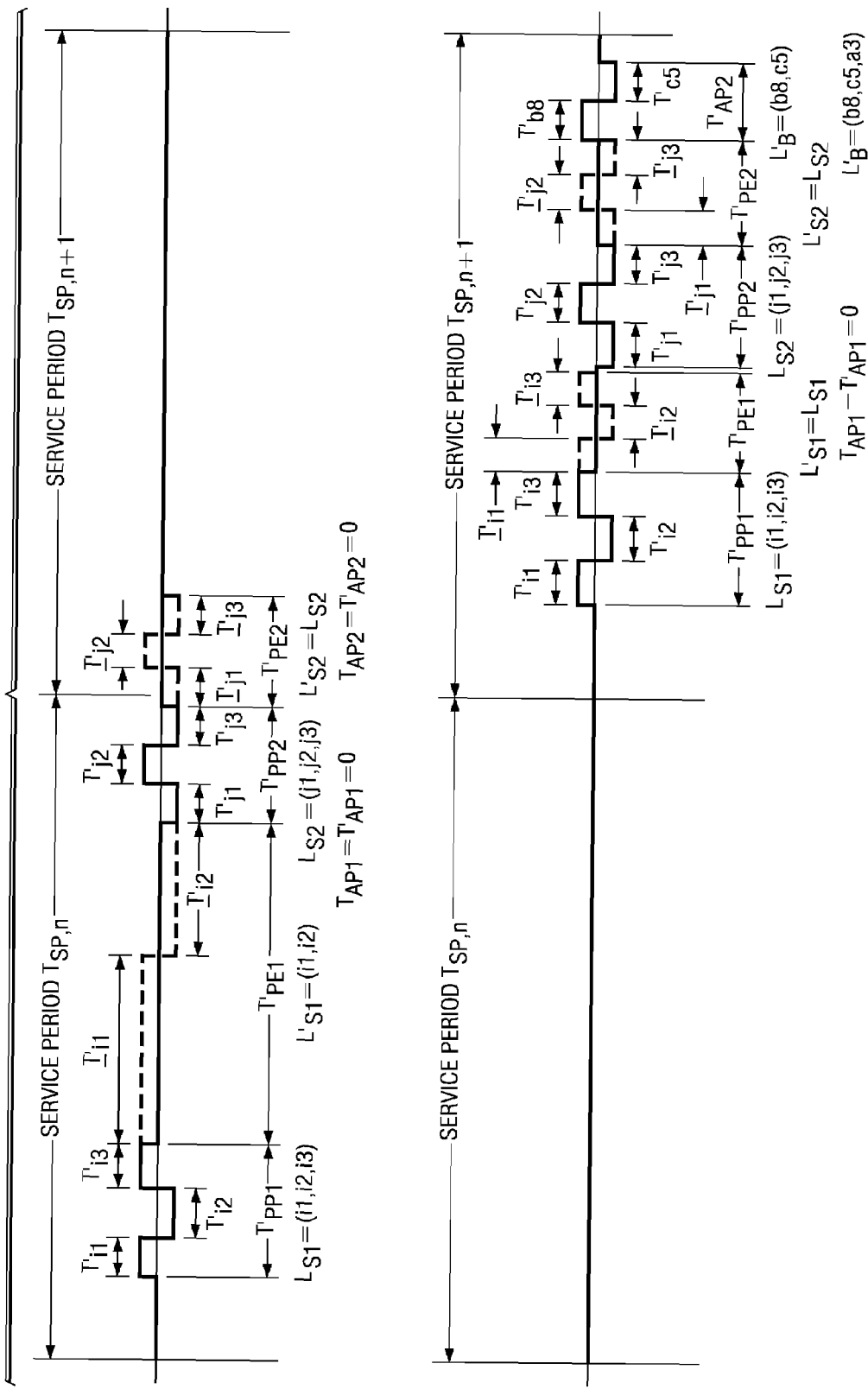

Referring now to FIG. 8, timing diagram (A) depicts no actually used burst interval T'$_{AP1}$ or T'$_{AP2}$ in service period T$_{SP,\,n}$ which was completely used by isochronous streams. In timing diagram (B), service period T$_{SP,\,n+1}$ comprises no actually used burst interval T'$_{AP1}$, but an actually used burst interval T'$_{AP2}$, the amount of access time used for bursts b8 and c5. More generally, if T'$_v$ is the access time actually used out of allocated time T$_v$, then the aggregate of the actual access times for cumulative bursts in a given burst interval T'$_{AP1}$ or T'$_{AP2}$ is given by:

$$T'_{APK} = \Sigma T'_v, \quad v \in L'_B \qquad \text{Eqn (7)}$$

In one embodiment of the present invention, T'$_{APK}$ can be less than or equal to the allocated interval T$_{APK}$, but it can never be greater. The burst list L'$_B$ must be limited so that T'$_{APK}$+T$_{C\text{-}MIN}$ ends before the scheduled start of the next primary access interval T$_{PP1}$ or T$_{PP2}$.

In implementing the scheduling of access times for streams and bursts, the indexes of the streams in L$_{S1}$ and L$_{S2}$ and/or of the bursts in L$_B$ are part of the parameters of the TX Descriptors of the corresponding streams or bursts in the data structure. There is prearranged certain memory space for storing the TX Descriptors of active streams and bursts.

The TX Descriptor of a stream or burst contains the Remaining Data Size or Additional Access Time. For down link transfers, this item is updated following an arrival of new data to the stream or burst, or following a successful transmission of a frame of the stream or burst. For uplink and sidelink transfers, this item is updated following a reception, by the AP, of a frame of the stream or burst, the received frame indicating the Remaining Data Size or Additional Access Time thereof. The TX Descriptor further contains scheduling parameters such as mean data rate and delay bound. A station maintains TX Descriptors for its own uplink and sidelink streams and bursts. The AP maintains a list of TX Descriptors for downlink as well as uplink and sidelink streams and bursts, the TX Descriptors for uplink and sidelink streams and bursts being reduced to contain the Remaining Data Size or Additional Access Time plus a few other parameters. The TX Descriptors at the AP will also have a parameter indicating whether it is for downlink or for uplink/sidelink, and a parameter indicating whether it is for a stream or for a burst.

One embodiment of the present invention comprises a procedure for determining whether or not a new stream should be admitted for access time scheduling. In such a procedure, the total access time used during the isochronous epochs of each of a number of previous service periods is tracked or monitored, and the access time required by the new stream is calculated. This information is then used to generate a ratio that is used to determine whether a new stream is to be admitted or rejected.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for scheduling access times for transmitting data frames from a first transmission point in a WLAN to a second transmission point therein, wherein data frame traffic includes both isochronous streams and asynchronous bursts and is characterized by variations in specified parameter values, the method comprising:
    defining a succession of service periods, each service period including a specified number of isochronous epochs;
    adapting at least one of the service periods to include at least one asynchronous epoch, each asynchronous epoch immediately following an isochronous epoch of the same service period and each asynchronous epoch is followed by at least one isochronous epoch of the same service period; and
    scheduling the access times for the isochronous streams only during the isochronous epochs, and for the asynchronous bursts only during the asynchronous epochs, wherein the lengths of the isochronous and asynchronous epochs fluctuate dependent on the dynamic needs and priorities of user traffic.

2. The method of claim 1 wherein each of the service periods includes two of the isochronous epochs, and further selectively includes one, two or none of the asynchronous epochs.

3. The method of claim 2 wherein said method further comprises incorporating each of the isochronous streams into one of two stream lists, each stream list corresponding to one of a primary access interval of each service period.

4. The method of claim 1 wherein each of the isochronous epochs includes a primary access interval and an extension period, at least one of the isochronous streams being scheduled for access time during each of said primary access intervals, and at least one of the scheduled isochronous streams being provided with additional access time during each of the extension periods.

5. The method of claim 1 wherein each of the isochronous epochs includes a primary access interval and an extension period, the extension period extendable into the next following scheduled isochronous epoch to the extent that sufficient access time is left to accommodate the next following scheduled primary access interval.

6. The method of claim 4 wherein the actual access time during one of the primary intervals starts earlier, but does not end later, than the corresponding scheduled access time, and the amount of access time actually used during one of the extension periods may not exceed the corresponding scheduled access time.

7. The method of claim 1 wherein each of the asynchronous epochs includes an asynchronous burst period and a contention period, at least one of the asynchronous bursts given access time during each of the burst periods.

8. The method of claim 7 wherein each of the asynchronous epochs ends before a scheduled commencement of the next following primary access interval.

9. The method of claim 7 wherein the amount of access time actually used during one of the burst periods does not exceed the corresponding scheduled access time.

10. The method of claim 7 wherein each of the asynchronous bursts is incorporated into a burst list.

11. The method of claim 7 wherein respective asynchronous bursts are allocated access times on the basis of specified weighting values.

12. The method of claim 1 wherein the length of a particular service period is determined from preselected maximum and minimum values, and from specified parameter values for the isochronous streams that are active at the time of determining the particular service period.

13. Apparatus for transmitting data frames from a first transmission point in a WLAN to a second transmission point therein, wherein data frame traffic includes both isochronous streams and asynchronous bursts, the apparatus comprising:
    a first component at a first transmission point for scheduling access times to transmit the data traffic during a succession of service periods, each service period including a specified number of isochronous epochs and at least one of the service periods including at least one asynchronous epoch, and each asynchronous is followed by at least one isochronous epoch; and
    a second component at the first transmission point acting in cooperation with the first component to successively transmit and receive the isochronous streams during isochronous epochs and asynchronous bursts during asynchronous epochs, wherein the lengths of the isochronous and asynchronous epochs fluctuate dependent on the dynamic needs and priorities of user traffic.

14. The apparatus of claim 13 wherein each of the service periods includes two of the isochronous epochs, and further selectively includes one, two or none of the asynchronous epochs.

15. The apparatus of claim 13 wherein the apparatus further incorporates each of the isochronous streams into one of two stream lists, each stream list corresponding to one of the primary access intervals of each service period.

16. The apparatus of claim 13 wherein each of the isochronous epochs includes a primary access interval and an extension period, at least one of the isochronous streams being scheduled for access time during each of the primary access intervals, and at least one of the scheduled isochronous streams being provided with additional access time during each of the extension periods.

17. The apparatus of claim 13 wherein each of the asynchronous epochs includes an asynchronous burst period and a contention period, at least one of the asynchronous bursts being given access time during each of the burst periods.

18. The apparatus of claim 13 wherein each of the asynchronous epochs ends before commencement of the next following primary access interval.

19. A computer program product embodied in a computer readable medium the execution of which by one or more processors causes the processors to define a succession of service periods, each service period including a specified number of isochronous epochs;
    adapt at least one of the service periods to include at least one asynchronous epoch, each asynchronous epoch immediately following an isochronous epoch of the same period and each asynchronous epoch is followed by at least one isochronous epoch of the same service period; and schedule the access times for the isochronous streams only during the isochronous epochs, and for the asynchronous bursts only during the asynchronous epochs, wherein the lengths of the isochronous and asynchronous epochs fluctuate dependent on the dynamic needs and priorities of user traffic.

20. The program of claim 19 wherein each of the service periods includes two of the isochronous epochs, and further selectively includes one, two or none of the asynchronous epochs.

21. The program of claim 19 further causing processors to incorporate each of the isochronous streams into one of two stream lists, each stream list corresponding to one of a plurality of primary access intervals of each service period.

22. The program of claim 19 wherein each of the isochronous epochs includes one or more primary access intervals, and includes one or more extension periods, at least one of the isochronous streams being scheduled for access time during each of the primary access intervals, and at least one of the scheduled isochronous streams being provided with additional access time during each of the extension periods.

23. The program of claim 19 wherein each of the asynchronous epochs includes an asynchronous burst period and a contention period, at least one of the asynchronous bursts being given access time during each of the burst periods.

24. The program of claim 19 wherein the actual access time during one of a plurality of primary intervals starts earlier, but does not end later, than the corresponding scheduled access time, and the amount of access time actually used during one of a plurality of extension periods does not exceed the corresponding scheduled access time.

* * * * *